Oct. 15, 1929.   J. AMSLER   1,731,964
VEHICLE DIRECTION INDICATOR
Filed Dec. 11, 1928
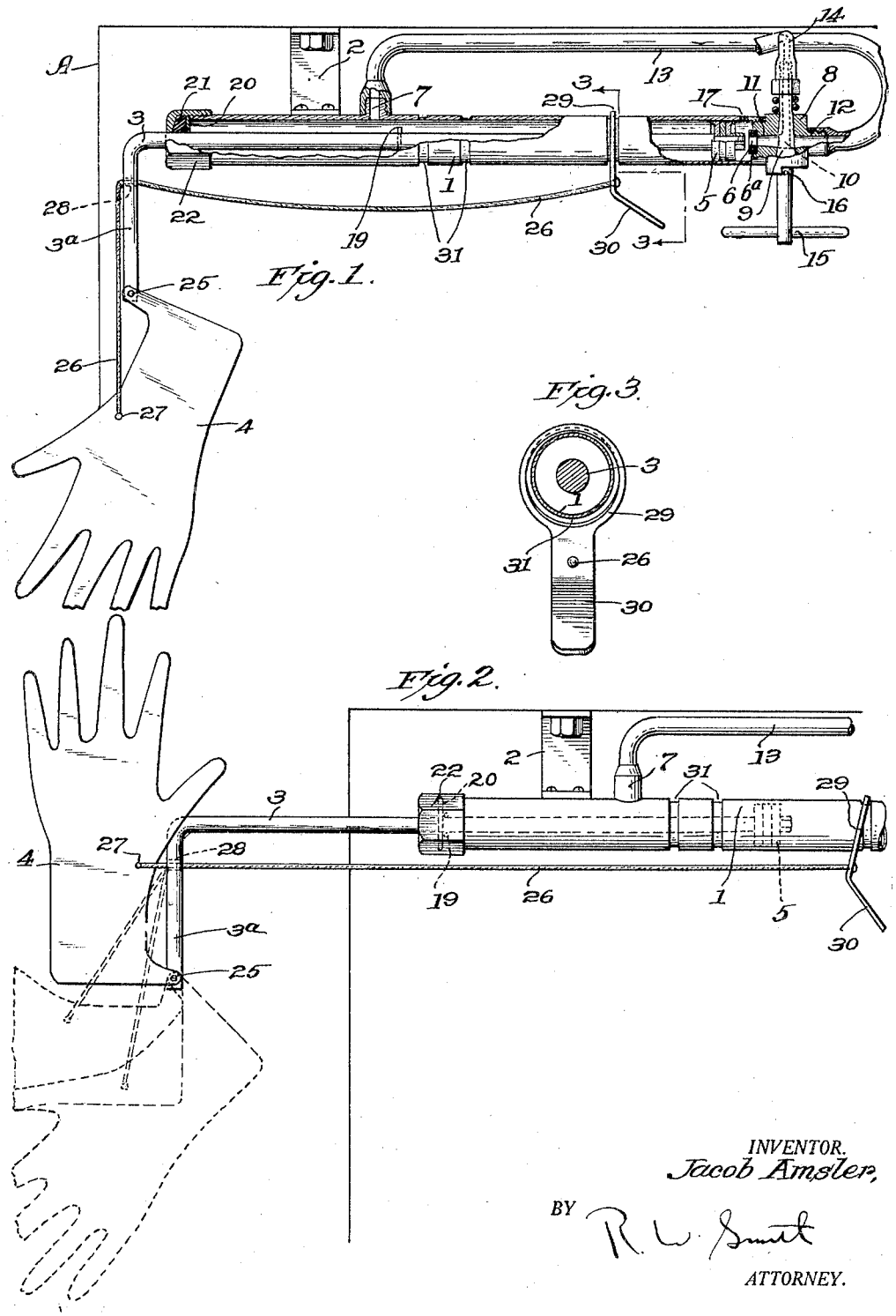
INVENTOR.
Jacob Amsler,
BY R. W. Smith
ATTORNEY.

Patented Oct. 15, 1929                                          1,731,964

UNITED STATES PATENT OFFICE

JACOB AMSLER, OF LOS ANGELES, CALIFORNIA

VEHICLE DIRECTION INDICATOR

Application filed December 11, 1928. Serial No. 325,174.

This invention is a direction indicator adapted for use on motor vehicles, and has for its object to provide an extremely simple and practical mechanism which may be readily controlled by the driver of a vehicle, and which is adapted for projection and selective shifting to predetermined positions which will visibly signal various intended changes in the movement of the vehicle.

More particularly it is an object of the invention to utilize the power of the motor, such as the suction of its intake manifold, for projecting the indicator from its inoperative retracted position, and to also provide a manually adjustable operating connection for selectively swinging the indicator to various signaling positions when it is so projected.

It is a further object of the invention to provide a manual control for the suction actuating means, adapted for convenient manipulation by the driver so as to positively retract or project the indicator, and to also adapt the manually adjustable operating connection for convenient control by the driver so as to automatically swing the projected indicator to any selected signaling position.

Further objects of the invention will be readily understood from the following description of the accompanying drawings, in which:

Fig. 1 is a front elevation of the indicator, partly in axial section, and showing it in its retracted inoperative position.

Fig. 2 is a similar view with the indicator projected, and showing by full and dotted lines the various signaling positions to which the projected indicator may be swung.

Fig. 3 is a transverse section on the lines 3—3 of Fig. 1.

The indicator is adapted for mounting on a motor vehicle, preferably adjacent the upper edge and inside the windshield, the frame of which is indicated at A, and the indicator comprises a transversely extending elongated cylinder 1 which may be mounted on frame A by means of bracket 2, and which slidably receives a rod 3 carrying a signaling element 4. The signal element is pivoted to a depending end $3^a$ of rod 3 which projects beyond cylinder 1 so that when the rod is retracted in the cylinder the signaling element will be in inoperative position at the side of the vehicle as shown in Fig. 1, and when the rod 3 is projected from the cylinder as shown in Fig. 2 the signaling element will be readily visible for indicating various intended changes in the movement of the vehicle by different positions to which the signaling element may be swung with relation to the arm end $3^a$.

The rod 3 is retracted and projected by the power of the motor, preferably by the suction in the intake manifold (not shown), and for this purpose a piston 5 is mounted on the inner end of rod 3 and ports 6—7 communicate with cylinder 1 at the respective sides of the piston so that suction through one or the other of said ports will reciprocate the piston in the cylinder and thus project and retract rod 3. A manual control is provided for selectively creating suction through ports 6—7, and as an instance of this arrangement a valve casing 8 may be mounted on the inner end of cylinder 1 beyond the piston 5, with a rotatable valve 9 mounted in said valve casing and having an axial bore 10 adapted for selective alinement with diametrically opposite ports 11—12 in the valve casing. The port 11 communicates with suction port 6, and the port 12 is connected by tubing 13 to the suction port 7 so that by turning valve 9 its axial bore 10 will communicate with either the port 6 or the port 7. A flexible conduit 14 is mounted on the projecting end of valve 9 and extends to the intake manifold of the engine so that the suction in said manifold is communicated to bore 10 and thence to either the port 6 or the port 7, depending upon the position to which valve 9 is turned, and the valve is provided with an operating handle 15 and an abutment 16 for limiting its rotation so as to aline bore 10 with either the port 11 or the port 12. A bleeder port 17 is preferably provided in cylinder 1 between valve casing 8 and the piston 5 so as to avoid a vacuum in the cylinder when rod 3 is projected by suction through port 7, and retraction of rod 3 is preferably limited and cushioned by a yieldable annulus 6ª mounted in valve casing 8 and surrounding port 6 in position for abutment by the end of piston 5. Movement of rod 3 in the opposite direction may be limited by a pin 19 extending through the rod and adapted for abutment against a washer 20 which is mounted in the outer end of cylinder 1. Packing 21 is provided between rod 3 and the outer end of cylinder 1 and may be held in place between the washer 20 and a coupling 22 which is threaded onto the outer end of the cylinder. The signaling element 4 preferably simulates the appearance of a human hand and is pivoted to the depending rod end 3ª as shown at 25 so that the signaling element will normally swing downwardly by gravity to non-signaling position shown in Fig. 1. The projection of rod 3 is adapted to swing the signaling element 4 to a selected signaling position determined by manual adjustment of an operating connection which is provided for the signaling element, and as an instance of this arrangemet a flexible connecting member shown as a wire 26 may be fixed to the hand 4 as shown at 27 and then extend upwardly alongside the rod end 3ª and thence through a transverse aperture 28 in said rod end and along the under side of cylinder 1. An annulus 29 is slidable on cylinder 1 and has a depending finger 30 to which the wire 26 is connected, and grooves 31 are formed in the outer surface of cylinder 1 and are axially spaced along the cylinder 1 for respective engagement by annulus 29, it being noted that when the annulus is seated in one of the grooves, and the wire 26 is tensioned, the finger end 30 of the annulus will be swung to a position binding the annulus in the groove and thus prevent axial displacement of the annulus on the cylinder as shown in Fig. 2, while release of the tension on the wire 26 will permit the finger 30 to swing the annulus 29 to a non-binding position as shown in Fig. 1, in order that the annulus may be readily shifted along the cylinder 1 by manually engaging the finger 30.

The wire 26 is of such length that when rod 3 is retracted the wire will be slack irrespective of the axial adjustment of annulus 29 along the cylinder 1, and the hand 4 will thus swing downwardly by gravity and remain in non-signaling position as shown in Fig. 1 as long as the arm 3 remains in retracted inoperative position. However, the length of wire 26 is such that projection of rod 3 will tension the wire and swing the hand 4 to signaling position if the annulus 29 is held against axial displacement on cylinder 1 by its binding engagement in any one of the grooves 31, and by selectively engaging the annulus in the respective grooves the hand 4 may be swung to various signaling positions by the projection of rod 3. For this purpose the grooves 31 are so placed that selective engagement thereof by annulus 29 will preferably swing hand 4 to upright position as shown in full lines in Fig. 2, or to one of the other of the dotted line positions of Fig. 2 wherein the hand is swung to either horizontal position or is inclined downwardly at approximately 45 degrees. These various signaling positions of hand 4 thus provide the conventional signals for a right-hand turn, a left-hand turn, or a decrease in speed, and by selectively engaging annulus 29 in the respective grooves 31 and then projecting arm 3, the hand 4 may be thus swung to any desired signaling position.

I have thus provided for projecting and retracting rod 3 by manually turning valve 9 so as to aline bore 10 with either port 11 or 12 and thus create suction in cylinder 1 at one side or the other of piston 5, and the wire 26 provides for swinging the hand 4 to signaling position by the projection of rod 3, with the manually controlled adjustment of annulus 29 along the cylinder 1 selectively controlling the signaling position to which the hand is swung. The improved construction thus provides an extremely simple indicator which may be readily controlled by the driver of a vehicle so as to project a visible signal to a selected conventional signaling position for clearly indicating intended movement of the vehicle.

I claim:

1. An indicator comprising a cylinder, a piston adapted for reciprocation in the cylinder, a supporting rod connected to the piston and projecting from the cylinder, ports in the cylinder at the respective sides of the piston, a conduit adapted to transmit operating pressure, manually operable means for selectively connecting the conduit with one or the other of the ports for projecting or retracting the supporting rod, a visible signal pivoted to the supporting rod, a flexible member connected to the signal and guided relative to the supporting rod above the pivotal mounting for the signal, an annulus fixed to the opposite end of the flexible member and slidable on the cylinder, and axially spaced grooves in the exterior surface of the cylinder adapted for selective reception of the annulus so as to bind the annulus against axial displacement on the cylinder when the flexible member is tensioned and permitting release of the annulus and axial adjustment thereof along the cylinder when said tension is relieved, the said grooves being so positioned that when respectively engaged by the annulus and the supporting rod is projected, the flexible member will swing the signal to various predetermined signaling positions, while retraction of the supporting rod will relieve the tension of the flexible member and permit the signal to drop to non-signaling position.

2. An indicator comprising a cylinder, a piston adapted for reciprocation in the cylinder, a supporting rod connected to the piston and projecting from the cylinder, ports in the cylinder at the respective sides of the piston, a conduit adapted to transmit operating pressure, manually operable means for selectively connecting the conduit with one or the other of the ports for maximum projection or retraction of the supporting rod, a visible signal pivoted to the supporting rod, a flexible member connected to the signal and guided relative to the supporting rod above the pivotal mounting for the signal, and means for fixing the opposite end of the flexible member at predetermined axially spaced points along the cylinder, the said points being so positioned that when said opposite end of the flexible member is fixed at the respective points and the supporting rod is projected to its maximum the flexible member will swing the signal to various predetermined signaling positions, while retraction of the supporting rod will relieve the tension of the flexible member and permit the signal to drop to non-signaling position.

3. An indicator comprising a cylinder, a supporting rod adapted for maximum projection and retraction relative to the cylinder, a visible signal pivoted to the supporting rod, a flexible member connected to the signal and guided relative to the supporting rod above the pivotal mounting for the signal, and means for fixing the opposite end of the flexible member at predetermined axially spaced points along the cylinder, the said points being so positioned that when said opposite end of the flexible member is fixed at the respective points and the supporting rod is projected the flexible member will swing the signal to various predetermined signaling positions, while retraction of the supporting rod will relieve the tension of the flexible member and permit the signal to drop to non-signaling position.

4. An indicator comprising a cylinder, a supporting rod adapted for projection and retraction relative to the cylinder, a visible signal pivoted to the supporting rod, a flexible member connected to the signal and guided relative to the supporting rod above the pivotal mounting for the signal, an annulus fixed to the opposite end of the flexible member and slidable on the cylinder, and axially spaced grooves in the exterior surface of the cylinder adapted for selective reception of the annulus so as to bind the annulus against axial displacement on the cylinder when the flexible member is tensioned and permitting release of the annulus and axial adjustment thereof along the cylinder when said tension is relieved, the said grooves being so positioned that when respectively engaged by the annulus and the supporting rod is projected the flexible member will swing the signal to various predetermined signaling positions, while retraction of the supporting rod will relieve the tension of the flexible member and permit the signal to drop to non-signaling position.

In testimony whereof he has affixed his signature.

JACOB AMSLER.